US009137316B2

(12) United States Patent
Menditto et al.

(10) Patent No.: US 9,137,316 B2
(45) Date of Patent: Sep. 15, 2015

(54) CONTROLLING RECEIPT OF ELECTRONIC ADVERTISING

(75) Inventors: Louis F. Menditto, Raleigh, NC (US); Kenneth Davidson, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 1288 days.

(21) Appl. No.: 11/861,896

(22) Filed: Sep. 26, 2007

(65) Prior Publication Data

US 2009/0083144 A1 Mar. 26, 2009

(51) Int. Cl.
G06Q 30/00 (2012.01)
H04L 29/08 (2006.01)
G06Q 30/02 (2012.01)

(52) U.S. Cl.
CPC ............... H04L 67/20 (2013.01); G06Q 30/02 (2013.01); G06Q 30/0207 (2013.01); H04L 67/04 (2013.01); H04L 67/2804 (2013.01)

(58) Field of Classification Search
USPC ............. 705/14, 14.53, 14.73; 455/414–420, 455/435; 707/1–10
See application file for complete search history.

(56) References Cited

U.S. PATENT DOCUMENTS

| 6,981,029 | B1 | 12/2005 | Menditto et al. |
| 2005/0215238 | A1* | 9/2005 | Macaluso ................. 455/414.1 |
| 2006/0240824 | A1* | 10/2006 | Henderson et al. ........ 455/435.1 |
| 2007/0088801 | A1* | 4/2007 | Levkovitz et al. ............ 709/217 |
| 2007/0113284 | A1 | 5/2007 | O'Rourke et al. |
| 2008/0312996 | A1* | 12/2008 | Ahopelto et al. ................. 705/7 |

FOREIGN PATENT DOCUMENTS

WO WO 2005/104593 A1 11/2005

OTHER PUBLICATIONS

International Search Report dated Mar. 18, 2009 for corresponding case PCT/US2008/077153.
Chinese Office Action from corresponding Chinese Patent Application No. 200880108787.6, 14pp., Apr. 15, 2013.
Communication pursuant to Article 94(3) EPC regarding European patent application No. 08 832 843.0, 5pp., Jun. 4, 2012.

* cited by examiner

*Primary Examiner* — Sun Li

(57) ABSTRACT

In one embodiment, a request for content is received. An electronic advertisement is associated with the content. A status of a device that transmitted the request for the content is determined. Data corresponding to the status is included in the request for the content. The electronic advertisement or receipt of the electronic advertisement is provided as a function of the included data.

18 Claims, 2 Drawing Sheets

CONTROLLING RECEIPT OF ELECTRONIC ADVERTISING

BACKGROUND

The present disclosure relates generally to data communication.

Computers, cell phones, and personal digital assistants ("PDAs") are used to download and view an abundance of information from the Internet, such as various webpages. For example, a cell phone or PDA user may be roaming outside of his or her provider network, but the user is still able to receive desired information. Users access such Internet pages from different locations using a variety of communication standards. A user can retrieve data content on his or her wireless device or wired system, such as a computer, via a second generation ("2G") cellular network, a third generation ("3G") cellular network, digital subscriber line ("DSL") connection, or any other high speed or low speed connection.

However, when roaming, a user may incur extra costs for data transfers. Therefore, if a user is downloading a website when roaming, electronic advertisements associated with the website increase cost to the user due to the size of the advertisement and/or download time. A user may have to pay for the increased cost, or the service provider may excuse the increased cost but ultimately pay the advertisement provider. Also, when roaming, a user may receive advertisements in a webpage that are not relevant to the user at his or her present location or time. Furthermore, a user of a device, such as a cell phone or a computer, may receive large or intricate advertisements when downloading content from the Internet. However, a device, for example, using a 3G system, will be able to download the advertisement faster than a device using a 2G or lower speed connection. The electronic advertisements impact the user's experience depending on the access type of the device.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
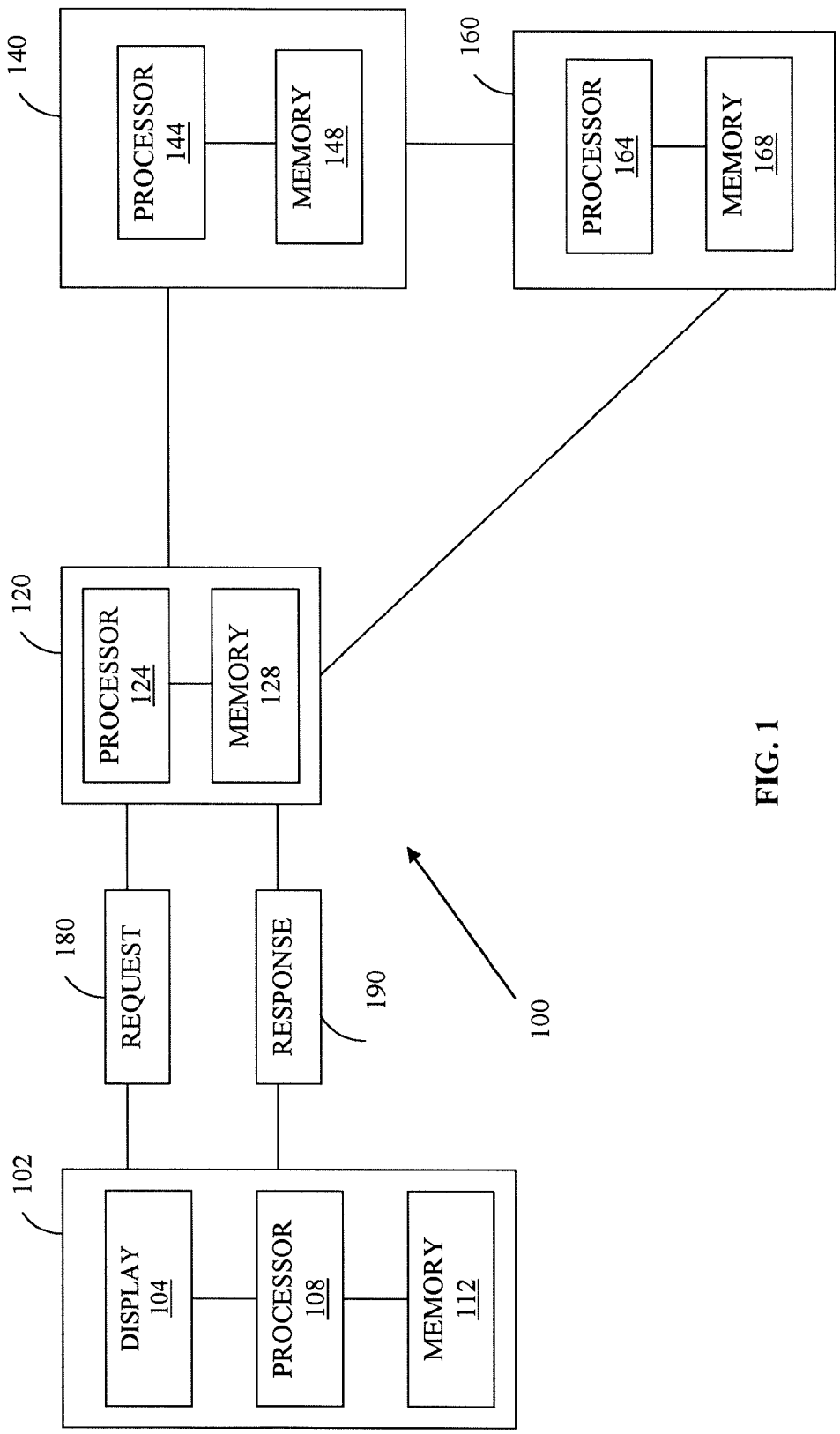
FIG. 1 illustrates one embodiment of a data communication system for controlling receipt of electronic advertising.

By way of introduction, the example embodiments described below include a data communication device and/or system and a method for controlling receipt of electronic advertising. The system includes a device requesting data content, a device receiving or intercepting the request, and at least one server. The device receiving or intercepting the request adds status information or data corresponding to the status of the requesting device to the request. The device requesting the data content receives electronic advertisements or the lack thereof from the server as a function of the additional information.

According to a first aspect, a request for content is received. An electronic advertisement is associated with the content. A status of a device that transmitted the request for the content is determined. Data corresponding to the status is included in the request for the content. The electronic advertisement or receipt of the electronic advertisement is provided as a function of the included data.

According to a second aspect, a device is operable to monitor data communication between a user device and a server. The device is further operable to receive a request and determine a status of the user device that transmitted the request. The device is further operable to include data corresponding to the status in the request. An electronic advertisement or receipt of the electronic advertisement is provided as a function of the included data.

According to a third aspect, a device is operable to provide advertising content to a wireless device. The device is further operable to provide an electronic advertisement based on a status of the wireless device. The electronic advertisement is provided in response to a request.

According to a fourth aspect, means for receiving a request for content is provided. An electronic advertisement is associated with the content. Means for determining a status of a user means that transmitted the request for the content is provided. Means for including data corresponding to the status in the request for the content is provided. The electronic advertisement or receipt of the electronic advertisement is provided as a function of the included data.

The present invention is defined by the following claims, and nothing in this section should be taken as a limitation on those claims. Further aspects and advantages of the invention are discussed below in conjunction with the preferred embodiments.

A subscriber's roaming status and/or access type is communicated to the content provider and/or content gateway so that advertisements can be stripped, blocked, or altered. The filtering or alteration of the advertisements depends on if the subscriber is roaming and/or the access type for the subscriber. The roaming and/or access type information can be communicated in a request via an Internet protocol ("IP") header option, transmission control protocol ("TCP") header option, application header, or other data location. Examples of application headers are hypertext transfer protocol ("HTTP") headers, extensible markup language ("XML") headers, real time streaming protocol ("RTSP") headers, etc. This allows the content providers, gateways, and/or content engines to modify the electronic advertisements associated with the requested content to better suit the subscriber's needs.

FIG. 1 shows one embodiment of a data communication system 100 (hereinafter referred to as "system 100"). The system 100 is an Internet protocol based system, an Intranet system, a telephony system, a cellular based system, a wireless or wired audio/visual data communication system, and/or any known or future data communication system.

The system 100 includes, but is not limited to, a device 102, a device 120, a server 140, and a server 160. Additional, different, or fewer components may be provided. For example, a proxy server, a billing server, a router, a switch or intelligent switch, a computer or workstation, administrative components, such as an administrative workstation, a gateway device, a backbone, ports, network, and network interfaces may be provided. The different components of the system 100 are connected via the Internet, an intranet, a local area network ("LAN"), a wide area network ("WAN"), a virtual private network ("VPN"), and/or any known or future network. Wired and/or wireless connections may be provided.

The device 102 is a wireless device (e.g., a cellular phone, a PDA, a wireless computer), a wired or cabled device (e.g., a desktop computer using a broadband cable or DSL connection), or any other data communication device that can be operated by a user. A user utilizes the device 102 to initiate phone calls, access the Internet, intranet, or other networks, and/or perform any other data processing. For example, the device 102 is a 2G or 3G cellular phone using a global system for mobile communications ("GSM"), wideband code division multiple access ("WCDMA"), or any other modulation or transmission scheme.

The device 102 includes a display 104, a processor 108, and a memory 112. Additional, different, or fewer components may be provided. For example, an input device is provided, such as a button, keypad, keyboard, mouse, trackball, rocker switch, touch pad, or voice recognition circuit. The processor 108 is in communication with the display 104, and the memory 112. The processor 108 may be in communication with more or fewer components. The processor 108 is a general processor, application-specific integrated circuit ("ASIC"), digital signal processor, field programmable gate array ("FPGA"), digital circuit, analog circuit, or combinations thereof. The processor 108 is one or more processors operable to control and/or communicate with the various electronics and logic of the device 102.

The display 104 is any mechanical and/or electronic display positioned for accessible viewing in, on, or in communication with the device 102. For example, the display 104 is a touch screen, liquid crystal display ("LCD"), or a plasma display. The memory 112 is any known or future storage device. The memory 112 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided.

The device 102 is operable to communicate with the device 120. The device 120 is a network access server, a gateway device, a billing server, a provider server, an advertisement server, and/or any other device operable to receive or intercept data packets over a network. For example, the device 120 is a gateway general packet radio service ("GPRS") support node or an authentication, authorization, and accounting ("AAA") server. The device 120 determines whether the device 102 is authorized to use the provider's network and/or calculates or accounts for usage cost and billing information. Alternatively, the device 120 is a switch or an intelligent switch controlling connections between the device 102 and external networks.

The device 120 is positioned between the device 102 and the servers 140 and/or 160. Requests and response flowing to and from the device 102 pass through the device 120. Alternatively, the device 120 is positioned between the server 140 and 160 or any other location within a common or external network (e.g., the device 120 is implemented by one or both of the servers 140, 160). The device 120 is operable to intercept or receive a request from the device 102. The device 120 is also operable to alter, modify, or filter data packets or insert information in data packets of the request.

The device 120 includes a processor 124 and a memory 128. Additional, different, or fewer components may be provided. The processor 124 is in communication with the memory 128. The processor 124 may be in communication with more or fewer components. The processor 124 is a general processor, application-specific integrated circuit ("ASIC"), digital signal processor, field programmable gate array ("FPGA"), digital circuit, analog circuit, or combinations thereof. The processor 124 is one or more processors operable to control and/or communicate with the various electronics and logic of the device 120 and/or the system 100.

The memory 128 is any known or future storage device. The memory 128 is a non-volatile and/or volatile memory, such as a Random Access Memory "RAM" (electronic), a Read-Only Memory "ROM" (electronic), or an Erasable Programmable Read-Only Memory (EPROM or Flash memory).

The device 120 is operable to communicate with the server 140. The server 140 is a provider server, an application server, communications server, advertisement server, database server, proxy server, file server, web server, client server, peer-to-peer server, and/or any known or future server. The server 140 is operable to receive content requests, such as a GET request for a webpage, and gather and/or provide content or links to content to the device 102.

The server 140 is a software and/or hardware implementation. For example, the server 140 is an application program. Alternatively, the server 140 is a server computer or any other hardware that executes and runs server applications. A hardware implementation of the server 140 includes, but is not limited to, a processor 144 and a memory 148. Additional, different, or fewer components may be provided. The processor 144 is in communication with the memory 148. The processor 144 may be in communication with more or fewer components. The processor 144 is a general processor, application-specific integrated circuit ("ASIC"), digital signal processor, field programmable gate array ("FPGA"), digital circuit, analog circuit, or combinations thereof. The processor 144 is one or more processors operable to communicate with electronics of the server 140 or other components of the system 100. The processor 144 is operable to control the various electronics and logic of the server 140 and/or the system 100.

The memory 148 is any known or future storage device. The memory 124 is a non-volatile and/or volatile memory, such as a Random Access Memory "RAM" (electronic), a Read-Only Memory "ROM" (electronic), or an Erasable Programmable Read-Only Memory (EPROM or Flash memory).

The server 160 is operable to communicate with the server 140 and/or the device 120. The server 160 is an advertisement server, an application server, communications server, database server, proxy server, file server, web server, client server, peer-to-peer server, and/or any known or future server. The server 160 is operable to receive electronic advertisement requests, such as a request for an advertisement on a webpage, and gather and/or provide the advertisement content to the device 102 or any other device or server of the system 100. The server 160 is implemented on separate hardware from or implemented on the same hardware as the server 140.

The server 160 is a software and/or hardware implementation. For example, the server 160 is an application program. Alternatively, the server 160 is a server computer or any other hardware that executes and runs server applications. A hardware implementation of the server 160 includes, but is not limited to, a processor 164 and a memory 168. Additional, different, or fewer components may be provided. The processor 164 and the memory 168 have the same structure as or different structure than the processor 144 and the memory 148, respectively.

In an alternative embodiment, the device 120 may be incorporated into the server 140 or 160. Or, the functions features of the servers 140 and 160 are combined into one server.

In operation, according to one embodiment, a user requests data content via the device 102. For example, the user requests a webpage or website. Other data content may be requested over the network, such as an audio and/or video file, email content, or other data files or messages. A request 180, such as a GET request, is then transmitted over the network. The request 180 includes one or more data packets or other information indicating a desire for content.

The request 180 is received at or intercepted by the device 120. The device 120 is able to read, analyze, modify, include, or generate existing or new information in the request 180. For example, the device 120 includes or inserts status information or data indicative of the status of the device 102 in the data packets of the request 180. The status information includes data regarding whether the device 102 is roaming outside of its network or the access type the device 102 is using. Alternatively, the device 102 includes information or data indicative of the status within a request rather than or in addition to the device 120.

The request 180 with the added data is then forwarded to the server 140. The server 140 gathers information to respond to the request, such as html content, tags, and/or links. The server 140 may gather the requested content from other servers, a cache, or other network devices. For example, the server 140 communicates with the server 160 to acquire advertisement content associated with the requested webpage.

Based on the added information in the request 180, the device 120, the server 140, and/or the server 160 filters, blocks, replaces, or removes data from the associated advertisement. Therefore, the device 102 receives a response 190 including an electronic advertisement that has been altered or not including the advertisement (e.g., the advertisement is blocked). The advertisement data received is based on the status of the device 102.

Alternatively, the server 140 returns html code with tags and/or links to the device 102 via the response 190. The device 102 transmits a second request 180 for an electronic advertisement based on a link in the received html code. The device 120 intercepts the second request and adds status information and forwards the second request to the server 160. The server 160 determines the type or alteration of the electronic advertisement, which is transmitted to the device 102 in another response 190.

Figure 2:
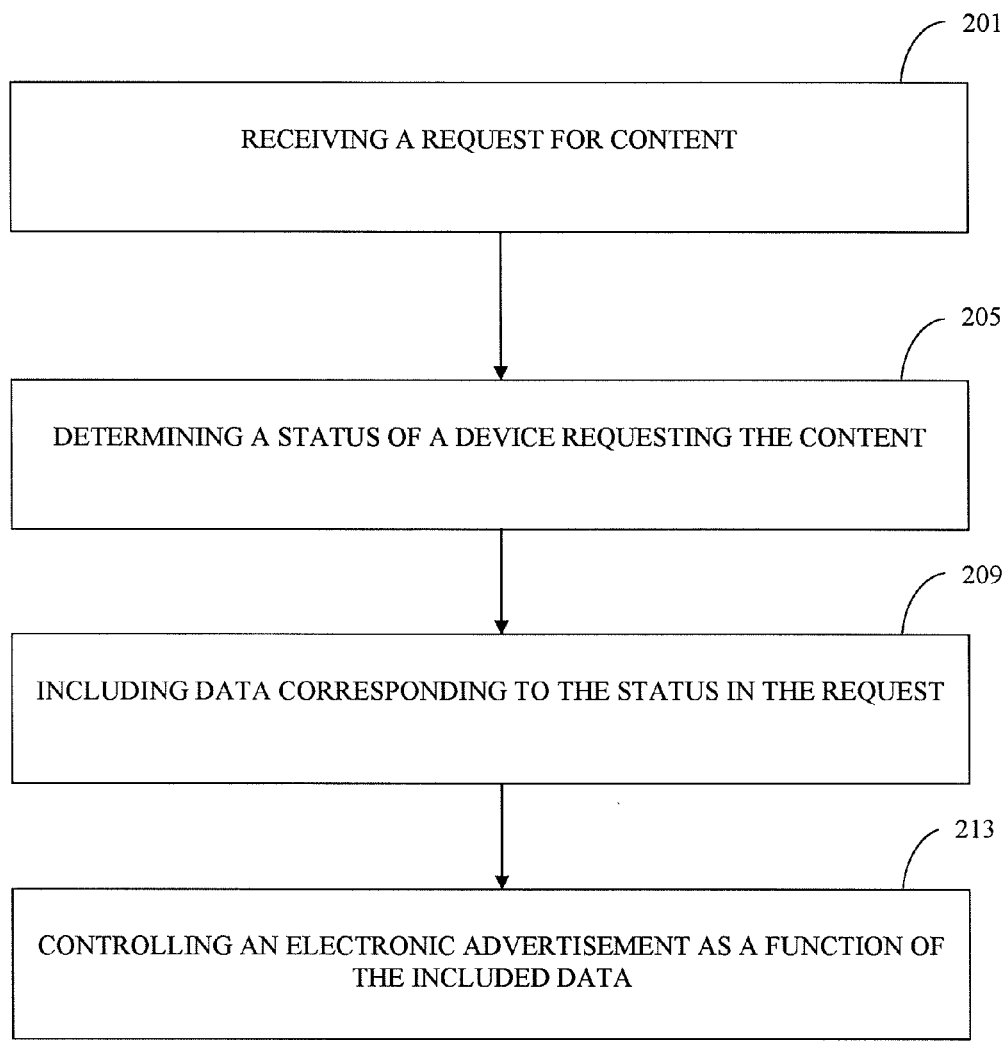
FIG. 2 illustrates one embodiment of a method for controlling receipt of electronic advertising.

FIG. 2 is a flowchart of one embodiment of a method for controlling receipt of electronic advertising. Fewer or more acts may be provided. The method is implemented by the system 100 of FIG. 1 or a different system.

In act 201, a request for content is received or intercepted, such as by the device 120. For example, a user turns on or enables a wireless or wired device, such as the device 102. The user requests data content over a network with the device 102. The user may request a webpage, a file, or other data over a network. For example, the user types a uniform resource locator ("URL") via the device 102 to request a webpage. As another example, the user selects a link shown on a display. The device 102 communicates with a name server, such as the server 140, 160, or other server, to obtain an IP address associated with the URL. Then, the device 102 sends a request, such as the request 180, over the system 100 to retrieve the webpage. A device, such as the device 120, intercepts or receives the request. Other network protocols may be used for acquiring content.

In act 205, a status of the device that transmitted the request for the content is determined. Status includes, but is not limited to, roaming status, access type, and other status information. For example, the device intercepting or receiving the request, such as the device 120, includes or is operable to obtain status information of the device 102. In one embodiment, status information of the device 102 is updated or transmitted to the network during registration. For example, when the device 102 turns on or is activated to communicate over the network, identification data including device information, communication information (such as whether the device 102 is using a 2G, 3G, wireless fidelity ("WiFi"), wired connection, such as an Ethernet connection, or any other access type), boundary information used to determine if the device 102 is roaming, and other registration information is uploaded to or present in devices on the network, such as the device 120. For example, status information can be obtained through remote authentication dial in user service ("RADIUS") authentication and/or dynamic host configuration protocol ("DHCP") registration.

Alternatively, status information is obtained by the device 120 through methods other than registration. For example, processing data indicative of an access type or roaming indications that may be transferred between endpoints or devices over the system 100 can be stored or cached during operation. Such information may be transmitted to the device 120 or the device 120 may retrieve the information to determine the status of the device 102.

In act 209, data corresponding to the status is included in the request for the content. For example, the device 120 modifies, alters, updates, or adds to one or more data packets of the received request or generates new data packets in the request. In one embodiment, the device 120 inserts a code, bit flag, or any other data indicative of the status of the device 102 in a HTTP header. Alternatively, the data may be inserted in any other application header, such as a RTSP or XML header, or any other header or designation within a data packet, such as an IP header or TCP header. Insertion in the HTTP header may allow easier access to the status information because of the nature of implementation of HTTP. IP and TCP headers are a part of networking layers, and, therefore, more code may have to be generated to access them. In an alternative embodiment, a separate packet or communication and/or insertion in the body of a message may be used.

The data indicative of status is a digital, numeric, and/or alpha-numeric code, bit(s), or key sequence that indicates that the device 102 is roaming and/or indicates the access type of the device 102. Such a key sequence may contain information indicating which network the device is roaming from (e.g., a wireless operator's MCC and MNC identifiers) and the type of access over which the user is roaming. As another example, a flag bit with a value 1 or 0 may be used to designate a roaming status or not. A code or a sequence of bits may designate different access types, such as a 2G, 3G, WiFi, broadband wired connection, or any other low or high speed connection to the system 100. The access type may be indicated by identifying a protocol, specific type, and/or access capability (e.g., bandwidth). A single code or sequence of bits is used to designate both roaming status and access type, or separate data indicators are used to designate roaming status and access type. The roaming indication is inserted in the same header or data packet designation as the access type indication. Alternatively, the roaming indication and the access type indication are inserted in different locations or designations within a data packet. Status information may be inserted into any number of data packets. Also, the status information is not limited to roaming status and access type, but other status information, such as processing speed, graphics capabilities, time of transmission, etc., may be utilized.

Insertion of data indicative of status may be inserted in all requests for data content. Alternatively, the data is inserted in only requests specific to retrieval of electronic advertisements. For example, based on implementation, a first request may retrieve html code, tags, and/or links but not actual image or advertisement content. A second request may be initiated by the device 102 to retrieve advertisement content, and, therefore, the data indicative of status is inserted in the second request, not the first request. The device 120 can view the destination of a request, via an IP address for example, to determine whether to insert the additional data or not.

In act 213, an electronic advertisement or receipt thereof is controlled as a function of the included data. When a webpage, file, or other data content is requested over a network, such as the Internet, an electronic advertisement may be sent to a user of the device 102 with the requested data content. For example, many webpages include dynamic or static advertisements that may or may not be refreshed. Typically, when a GET request is received by a server, such as the server 140, the server retrieves and sends html code, tags, and/or links to the device 102. One of the links may be for requesting an advertisement, and, therefore, the device 102 transmits a second request to retrieve the advertisement content from a server, such as the server 160. Alternatively, the advertisement content is sent to the device 102 based on the first request.

An advertisement server, such as the server 160, determines what advertisement associated with the requested content to send. The determination may be a random determination, a determination based on a predetermined list or sequence, or based on negotiations between the service provider and the advertisement provider.

When the advertisement server receives the status indication, any number of actions may occur regarding the electronic advertisement to be sent. For example, if the status information indicates that the device 102 is roaming or is using a lower speed connection, such as a 2G connection, then the advertisement server removes data from the electronic advertisement or does not send any advertisements. Alternatively, if the status information indicates that the device 102 is not roaming or is using a higher speed connection, such as a 3G connection or a broadband cable connection, the advertisement server transmits advertisement content in a normal fashion.

Alternatively, an electronic advertisement can be replaced based on roaming status. For example, if a local advertisement that would normally be sent to the device 102 is to be transmitted, the advertisement server may decide to send another advertisement based on the roaming status of the device 102 because the device 102 is not in its local vicinity. Such functionality can be implemented in regards to timing as well. For example, if an advertisement that would be normally sent during lunch time or any other specific time is to be transmitted, the advertisement server may decide to send another advertisement based on the roaming status because of the time difference between the local time and the roaming time.

In an alternative embodiment, instead of or in addition to the status indication, the device 120 inserts data or code indicative of alteration of an electronic advertisement. For example, the device 120 or any other device in the system 100 includes a predetermined list of alteration or filtration commands. The commands may be stored in a memory, such as the memory 128, as a look-up-table ("LUT"). When the device 120 receives or intercepts a request, instead of or in addition to inserting indication of status, the device 120 inserts a command or data that sets out a type, alteration, and/or filtration of the electronic advertisement. An example of a type of electronic advertisement includes a reduced data electronic advertisement, a filtered electronic advertisement, a blocked electronic advertisement, or a replaced electronic advertisement (such as a regional electronic advertisement relevant to the location of the device 102). For example, when such a command is received at the advertisement server, the server processes the command and filters, removes data, blocks, or replaces the advertisement, as described above, based on the command.

Any combination of roaming status, access type, or any other status information may be used by the advertisement server to alter or filter the electronic advertisement or receipt of the electronic advertisement. The service provider and the advertisement provider may negotiate alteration strategies based on status information. Alternatively, alteration or filtration may occur external to the advertisement server. For example, any other device in the system 100 alters or filters advertisement content to be received at the device 102 based on the status information or command data that corresponds to the status.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method comprising:

receiving, at a network device, a request for content, an electronic advertisement associated with the content;

determining, using the network device, a communication status of a device that transmitted the request for the content;

inserting, using the network device, a command corresponding to the communication status in the request for the content, wherein the command defines an alteration or filtration of only the electronic advertisement;

forwarding the request for content including the command from the network device to a provider server;

re-formatting the electronic advertisement as a function of the command corresponding to the communication status; and provisioning of content responsive to the request unaffected by the command.

2. The method of claim 1, wherein the request comprises a request for a webpage.

3. The method of claim 1, wherein determining the communication status of the device comprises determining whether the device is roaming.

4. The method of claim 1, wherein determining the communication status of the device comprises determining an access type of a current connection of the device.

5. The method of claim 4, wherein determining the access type comprises determining whether the device is using a 2G, 3G, WiFi, or wired broadband connection.

6. The method of claim 1, wherein determining the communication status is based on a registration of the device in a network.

7. The method of claim 1, wherein providing of the electronic advertisement or receipt of the electronic advertisement comprises removing data from the electronic advertisement.

8. The method of claim 1, wherein providing of the electronic advertisement or receipt of the electronic advertisement comprises blocking the electronic advertisement.

9. The method of claim 1, wherein providing of the electronic advertisement or receipt of the electronic advertisement comprises replacing the electronic advertisement with another electronic advertisement.

10. The method of claim 1, wherein the command is included in a HTTP, IP, or TCP header.

11. The method of claim 1, wherein the request for content comprises a first request and a second request, the second request being for requesting the electronic advertisement and including data corresponding to the status.

12. The method of claim 1, further comprising:
removing data from the electronic advertisement based on the communication status of the device that transmitted the request for the content, wherein the communication status is a communication type selected from the group consisting of roaming cellular network, home cellular network, and wireless local area network.

13. An apparatus comprising:
a device operable to monitor data communication between a user device and a server,
wherein the device is further operable to receive a request for content and determine a type of communication used by the user device that transmitted the request for content when the request was transmitted,
wherein the device is further operable to include a command corresponding to the status in the request, wherein the command is associated with the type of communication used by the user device and defines an alteration or filtration for only an electronic advertisement associated with the content, and
wherein the device is further operable to re-format the electronic advertisement as a function of the command and to provision content responsive to the request without alteration or filtration as a function of the command.

14. The apparatus of claim 13, wherein the type of communication used by the user device indicates whether the user device is roaming.

15. The apparatus of claim 13, wherein the processor reduces an amount of data required by the electronic advertisement based on the type of communication used by the user device or filters the electronic advertisement based on the type of communication used by the user device.

16. The apparatus of claim 13, wherein the electronic advertisement comprises a regional electronic advertisement based on roaming or no electronic advertisement.

17. The apparatus of claim 13, wherein the device is further operable to insert the command in a HTTP, IP, or TCP header.

18. An apparatus comprising:
a memory storing a plurality of alteration codes;
a processor to receive a request for content, an electronic advertisement associated with the content;
wherein the processor is configured to determine a communication status of a user means that transmitted the request for the content and configured to include data corresponding to the communication status and an alteration or filtration of only the electronic advertisement in the request for the content,
wherein the processor means is configured to re-format the electronic advertisement or as a function of the included data, and to provision content which is responsive to the request unaffected by the included data.

* * * * *